United States Patent [19]

Ducate, Jr. et al.

[11] Patent Number: 4,934,333
[45] Date of Patent: Jun. 19, 1990

[54] SAFETY APPARATUS FOR STOVE-TOP BURNERS

[75] Inventors: John S. Ducate, Jr., Columbia; Bernard Berger, Aiken, both of S.C.

[73] Assignee: The Ducane Company, Inc., Columbia, S.C.

[21] Appl. No.: 346,481

[22] Filed: May 2, 1989

[51] Int. Cl.⁵ .............................................. F24C 15/30
[52] U.S. Cl. ........................................ 126/24; 126/211
[58] Field of Search ............... 126/211, 24; 24/662, 24/324

[56] References Cited

U.S. PATENT DOCUMENTS

| | | | |
|---|---|---|---|
| 2,943,373 | 7/1960 | Rapata | 24/662 |
| 3,416,200 | 12/1968 | Daddona | 24/662 |
| 3,515,116 | 6/1970 | Finnstrand | 126/24 |
| 3,960,134 | 6/1976 | Scott | 126/24 |
| 4,745,905 | 5/1988 | Lucky | 126/24 |

Primary Examiner—Carroll B. Dority
Attorney, Agent, or Firm—Pollock, Vande Sande & Priddy

[57] ABSTRACT

Safety apparatus for a stove-top burner, especially for a side cooker apparatus for a gas-fired grill. The safety apparatus is a barrier at least partially surrounding a cooking container placed over the burner. The barrier may be in the form of a band or a plurality of spaced-apart coaxial wires which are secured to a stove top to prevent pots and pans from sliding off the burner. The cooking apparatus for which this safety device is well-suited is a side cooker.

14 Claims, 5 Drawing Sheets

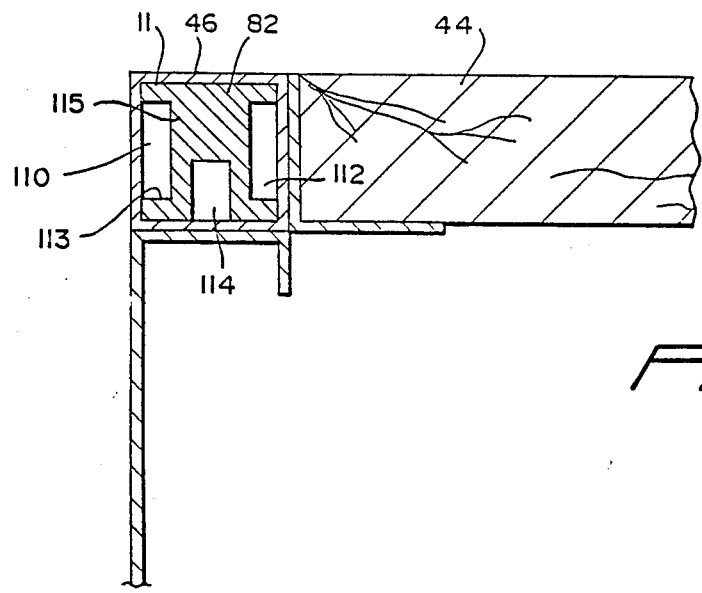
FIG_5
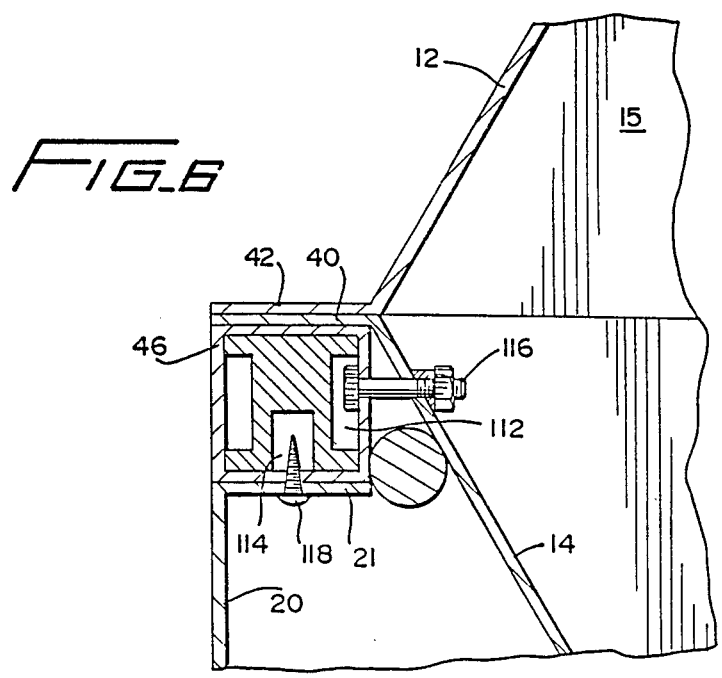
FIG_6

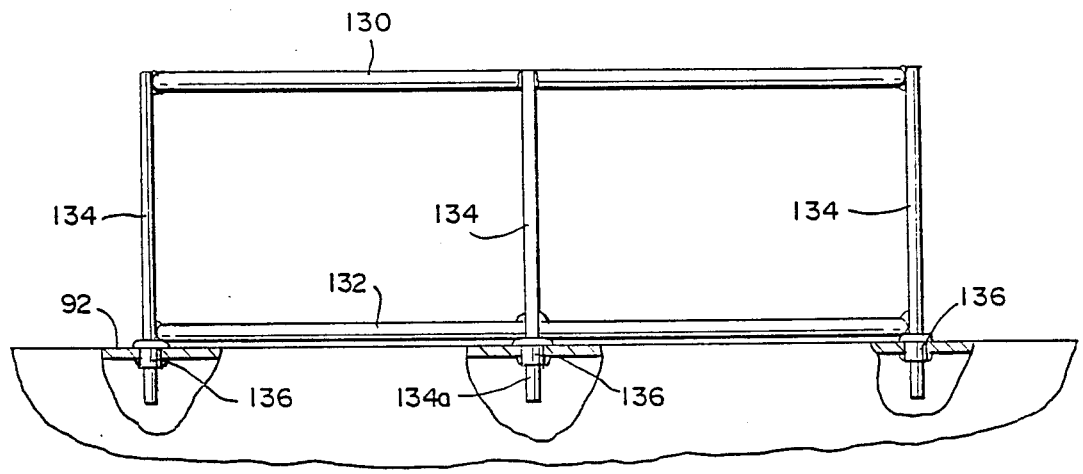
FIG_9
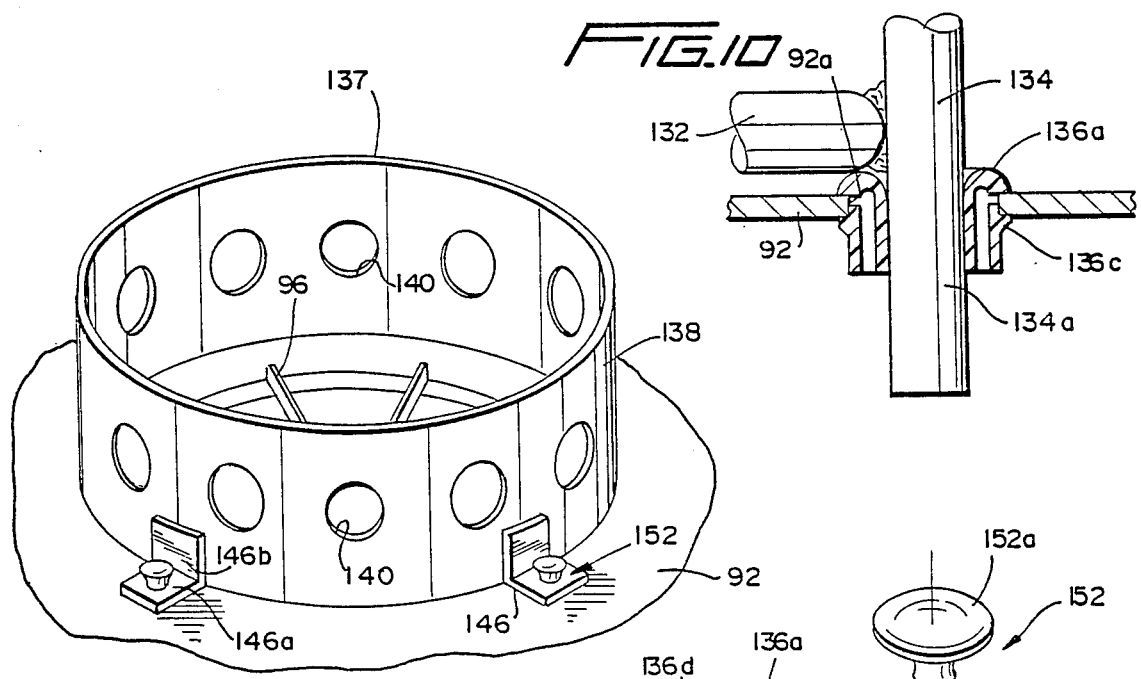
FIG_12 FIG_10 FIG_11
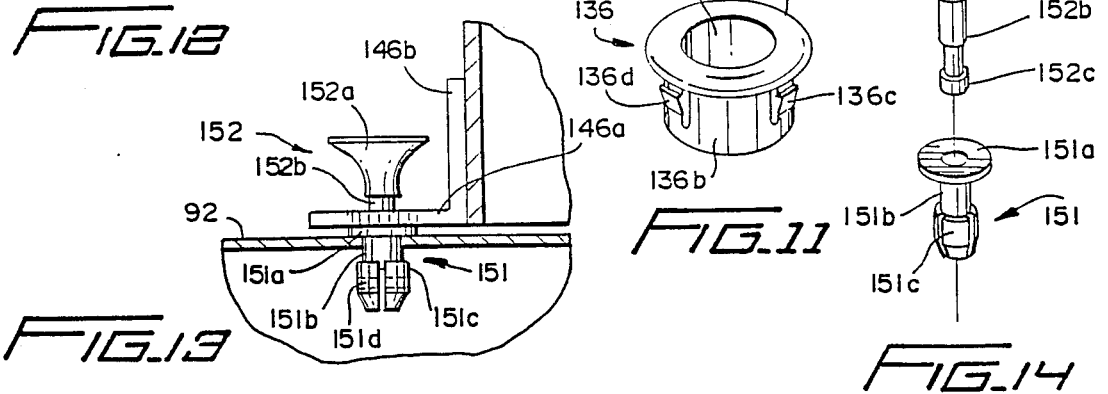
FIG_13 FIG_14

SAFETY APPARATUS FOR STOVE-TOP BURNERS

The present invention relates generally to safety accessories for stoves, and more particularly to safety devices for stove-top burners.

BACKGROUND OF THE INVENTION

Stove-top burners present a potential safety hazard because of the ease with which cooking vessels containing hot food can be accidentally knocked off the cooking surface and spill hot food on persons standing nearby. This hazard is increased for portable stoves such as portable grills because the stove or grill itself may be accidentally moved, thus jarring the cooking vessel which may then slide off or tip over.

SUMMARY OF THE INVENTION

A principal object of the invention is to provide safety apparatus for a stove having a top burner.

Another object of the invention is to provide safety apparatus which is particularly well-adapted for use with portable cooking stoves.

In accordance with the present invention, there is provided a safety apparatus for a stove having a top wall defining an opening for a burner element, and support means for supporting a food cooking container over the burner element. The safety apparatus comprises a safety barrier for at least partially surrounding the food cooking container, and retainer means for mounting the safety barrier in a fixed position on the top wall such that lateral movement of the food cooking container off of the support means is prevented by engagement with the safety barrier. The safety barrier extends generally parallel and in spaced relation to the side of the food cooking container.

This safety apparatus is particularly well-suited for use with portable stove-top burners such as, for example, stove top cookers which are used with a portable grill. This invention will therefore be described in detail in combination with a side cooker apparatus for a portable grill. It will be recognized by workers skilled in the art that the safety barrier described herein may be used with a wide variety of stove-top cookers including those having electric as well as gas-fired burners, and with non-portable as well as portable stoves.

BRIEF DESCRIPTION OF THE DRAWINGS

The invention is further described in the detailed description below taken in conjunction with the accompanying drawings in which:

FIG. 5 is a partial sectional view taken along line A—A of FIG. 1.

FIG. 6 is a partial sectional view taken along line B—B of FIG. 3.

FIG. 9 is an elevational view of the embodiment of the safety barrier shown in FIG. 4.

FIG. 10 is a partial sectional view of details of means securing the safety barrier of FIG. 9 to the top wall of a stove.

FIG. 11 is an isometric view of a grommet for a safety barrier as shown in FIGS. 9 and 10.

FIG. 12 is an isometric view of another embodiment of a safety barrier.

FIG. 13 is a partial sectional view of means for fastening the safety barrier of FIG. 12 to the top wall of a stove.

FIG. 14 is an exploded isometric view showing details of the fastening means of FIG. 13.

DETAILED DESCRIPTION OF THE INVENTION

The benefits of the present invention are particularly evident when it is used with portable stoves; consequently, a portable stove, referred to herein as a side cooker apparatus, for which the safety barrier of the present invention may be used, is described in detail. However, since this invention is capable of use in many different forms, it is understood that the detailed description herein is not intended to limit the invention to the embodiment illustrated.

Figure 1:
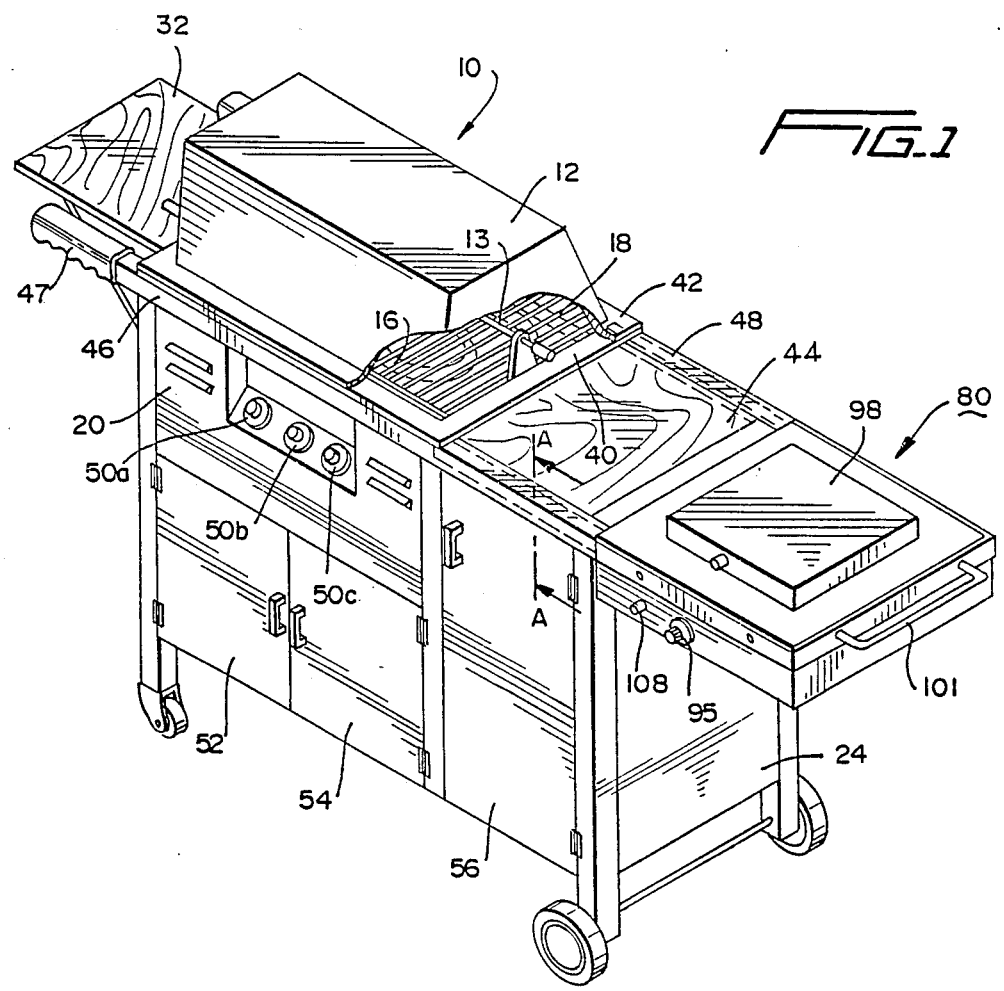
FIG. 1 is an isometric view of a gas-fired grill unit which includes one embodiment of a side cooker apparatus useful with the present invention.

As shown in FIG. 1 of the drawings, side cooker 80 is secured to a grill 10 by means described hereinafter. The grill 10, as shown and described, is of the type manufactured and marketed by Ducane Industries, Inc., of Columbia, South Carolina, and includes a work counter 32, and a cutting board component 44 (preferably made of wood). A main firebox 14 (FIG. 6) is provided with a rim 40 which abuts against a rim 42 of a hood 12. The firebox 14 is enclosed in a grill cabinet 11 comprising a front wall panel 20, a rear panel 22 and a panel at each end, only end panel 24 being shown. A main gas burner 16 and a cooking grid 18 are mounted in a cooking chamber 15 between firebox 14 and hood 12. A rotisserie 13 is mounted above grid 18 and is driven by an electric motor 38.

A fuel tank 58 is mounted in a compartment 57 behind a front door 56. A rear door (not shown) having a slot or aperture for a gas line 62 also may be provided at the rear of compartment 57. Fuel is transferred between fuel tank 58 and main burner 16 through a main valve 64, a pressure reducer 66, a conduit 60 and any one or more of valves 50a, 50b and 50c, which are mounted behind a front wall panel 20 which is positioned above a pair of doors 52, 54.

The firebox 14 and hood 12 are supported on a pair of parallel channels 46, 48, which form a pair of handles 47, 49, one of which is seen in FIG. 6, and extend from adjacent work counter 32 to the outer side edge of cutting board component 44. A plurality of bolts 116, one of which is seen in FIG. 6, secures channel 46 to base 14 and front wall panel 20 is secured to channel 46 by a plurality of screws 118 which pass through a panel flange 21. A rod 120 is secured, as by welding, to firebox 14 and/or to channel 46 to prevent the channel from distorting as a result of the forces exerted by bolt 116. The top of channel 46 also may be welded to overlapping rim 40. A similar arrangement secures rear wall panel 22 and the rear wall of firebox 14 to rear channel 48.

Work counter 32, which is positioned between handles 47, 49, is held in a working position by a support 34, and is attached to the side of the grill cabinet by hinges (not shown) to permit folding the work counter 32 into a vertical position, thus permitting convenient access to handles 47 and 49 for moving the grill.

The entire assembly is supported by four legs 26, one at each corner, which are provided at their lower ends with casters 30 at the side of the grill near the handles 47, 49, and wheels 28 at the side near the fuel tank 58.

Figure 3:
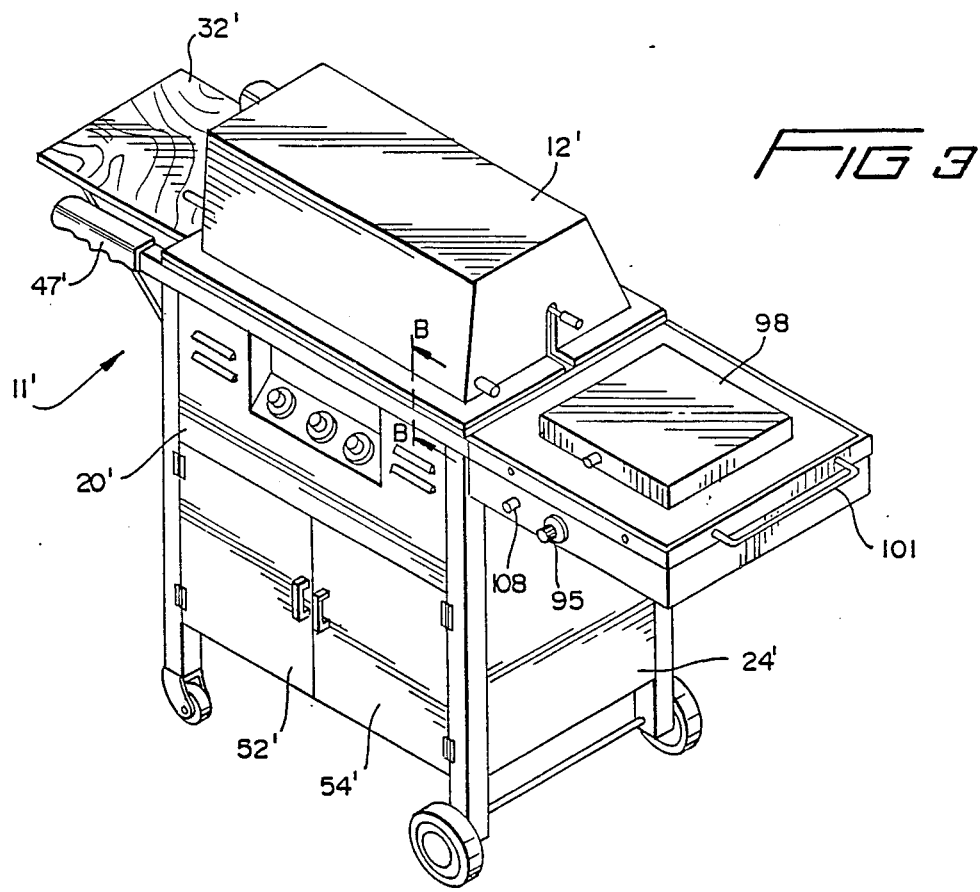
FIG. 3 is an isometric view of the side cooker apparatus of FIG. 1 supported by a modified gas-fired grill unit.

The grill assembly shown in FIG. 3 is similar to that shown in FIG. 1, the principal differences being the elimination of the cutting board component 44, and the positioning of the fuel tank in the space behind the front wall panel 20' and doors 52', 54' of cabinet 11'.

Figure 4:
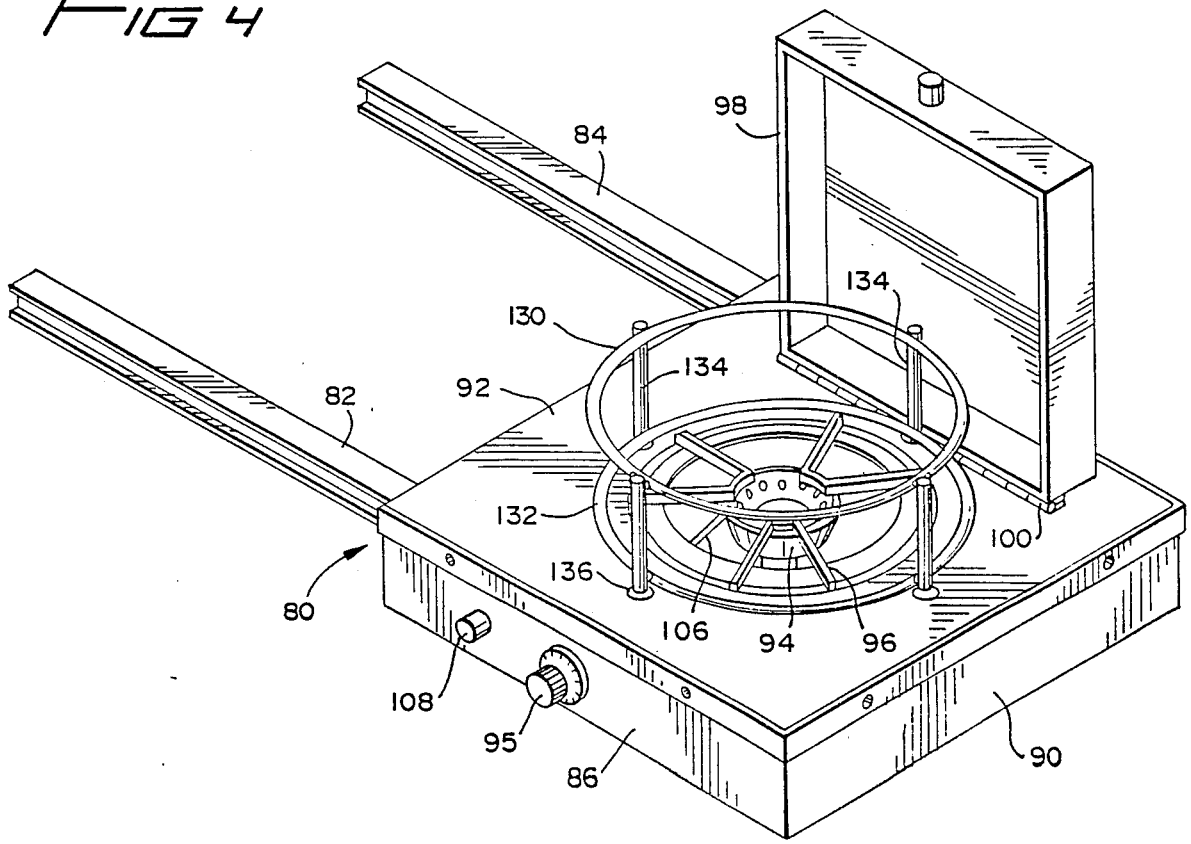
FIG. 4 is an isometric view of the side cooker apparatus which is separated from the gas-fired grill units of FIGS. 1 and 3, and includes one embodiment of a safety barrier of the present invention.
Figure 7:
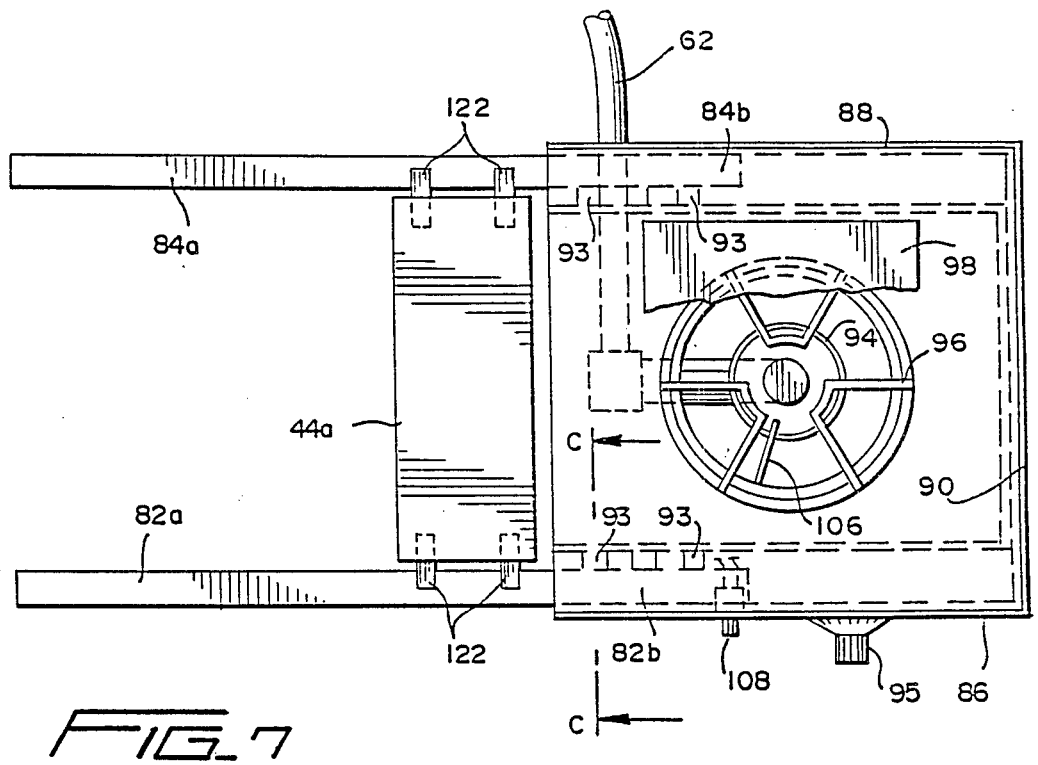
FIG. 7 is a plan view of the side cooker apparatus shown in FIG. 4.
Figure 8:
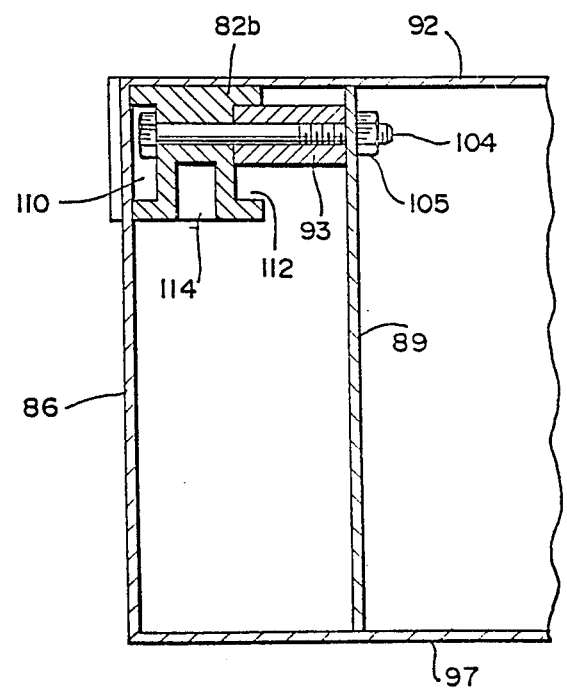
FIG. 8 is a partial sectional view taken along line C—C of FIG. 7.

As shown in FIGS. 4, 7 and 8, the side cooker apparatus 80 includes a box-like structure defined by a front wall 86, a back wall 88, an end wall 90, a bottom wall 97 and a top wall 92. The top wall 92 is provided with an aperture in which an auxiliary gas burner 94 and a utensil support 96 are mounted. Fuel is transferred between fuel tank 58 and auxiliary gas burner 94 through main valve 64, a second pressure reducer 68, a second gas line 62 and a control valve 95 mounted behind front wall 86. The burner is lit by an igniter 106 which dischargers a spark to burner 94 when activated by pushing a button 108 which is also mounted in front wall 86.

A gas burner cover 98 is pivotally mounted on top wall 92 by a hinge 100. The side cooker 80 is detachably mounted on grill 10 by a pair of parallel bars 82, 84 which have projecting portions 82a, 84a and holding portions 82b and 84b, respectively. Bars 82 and 84 are spaced transversely apart and are sized to fit within the front channel 46 and the rear channel 48, respectively, of the grill. In the embodiment shown, these bars have an I-shape cross-section, which provides an outer recess 110, an inner recess 112 and a lower recess 114 (see FIGS. 5 and 6). The recesses 110, 112 and 114 may be made by cutting corresponding slots in rectangular bar stock so as to form a head portion 111 and a foot portion 113 connected respectively by a central rib 115 as shown in FIG. 5. These respective recesses are provided to enable each bar to be inserted within its corresponding channel and slide past the heads of bolts 116 and the threaded tips of screws 118, since each of these elongated fastening elements extends past the inner surfaces of channels 46, 48. A handle 100 secured to the outer side edge of side cooker 80 provides a hand grip for implementing such sliding movement when attaching or detaching the side cooker.

Figure 2:
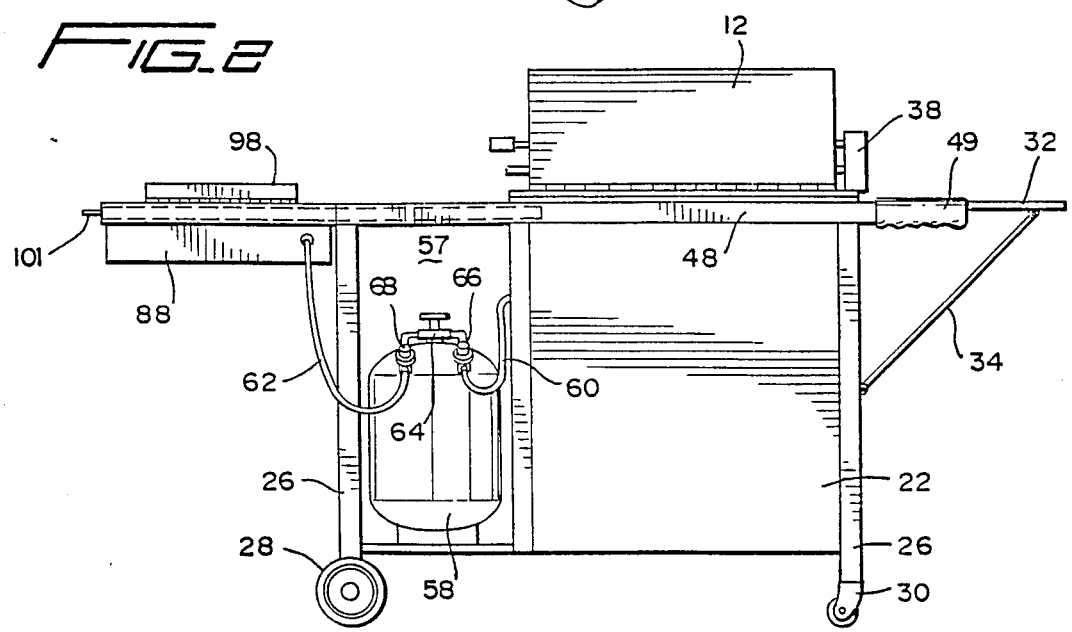
FIG. 2 is a rear elevational view of the embodiment of FIG. 1.

The length of the projecting portions 82a, 84a must extend into the corresponding channels for a distance sufficient to support the entire weight of the cantilevered portion of the side cooker apparatus. Accordingly, these portions preferably extend for at least one-third of the length of the channels into which they fit. More preferably, these projecting portions extend more than one-half, and may extend the entire length of channels 46, 48. The bars are preferably long enough so that the side cooker is firmly anchored in place. For example, in the embodiment of FIGS. 1 and 2, the bars preferably extend all the way past the intermediate cutting board component and into the channel portions adjacent to the firebox 14, as shown in these Figures.

In one embodiment of the side cooker, as shown in FIG. 8, the holding portions 82b, 84b are secured to the frame of the side cooker by means providing for their lateral adjustment so as to enable use of the side cooker with grills having different lateral spacings between channels 46 and 48. As shown in FIG. 8, bolt 104 passes through bar 82b and an elongated spacer member 93 and is secured to an inner frame wall 89 by a nut 105. The plurality of spacer members 93, as shown in FIG. 7, provides means for changing the distances between bars 82 and 84 by using spacers 93 of different lengths. Spacers 93 are preferably made as elongated hollow pins. However, these pins may be replaced by one or more rectangular blocks extending parallel to a corresponding bar and having a plurality of bores for bolts 104.

As shown in FIG. 7, the side cooker also may provide support on projecting portions 82a, 84a for work counter 44a. As shown, worker counter 44a is supported by four stepped brackets 122, each of which has a lower horizontal arm extending beneath auxiliary work counter 44a and an upper horizontal arm for resting on bar portions 82a, 84a. The counter 44a may be made of wood to provide a cutting board-like component 44, and is especially useful for grills of the type shown in FIG. 3.

In one embodiment of the present invention, as shown in FIGS. 4, 9 and 10, the safety barrier consists of a plurality of spaced-apart, substantially horizontal coaxial wire rings 130, 132, supported above the burner element 94 by a plurality of vertically extending legs 134, which are secured to wire rings 130, 132 as by welding. The lower portion 134a of each leg 134 passes into an axial passage 136d in grommet 136 which is positioned in an aperture 92a in the top surface 92 of the side cooker. In a preferred embodiment shown in FIGS. 10 and 11, grommet 136 consists of head 136a, cylindrical sidewall 136b defining axial passage 136d, and at least two resilient fingers 136c projecting radially outward from sidewall 136b. Fingers 136c are forced inwardly when grommet 136 is inserted in aperture 92a and then snap out to engage the underside of top wall 92 to prevent removal of grommet 136 from aperture 92a. Grommets which are thus locked in place can only be removed by pressing fingers 136c inwardly until they clear aperture 92a. In this embodiment, the safety barrier is readily removed from the stove top by merely lifting it until the legs clear the grommets.

The spacing between rings 130, 132 and the height of the upper ring 130 above top surface 92 are not critical; however, upper ring 130 is preferably positioned low enough so that it does not obstruct handles on cooking vessels, and may suitably extend from less than about 3 inches to over 6 inches above the cooker surface.

The safety barrier may be made in other configurations such as, for example, a cylindrical band, one embodiment of which is shown in FIGS. 12 and 13. In this embodiment, the safety barrier comprises cylindrical wall 137 having outer surface 138 and a plurality of perforations 140. A plurality of circumferentially-spaced right angle members 146, each having a vertical leg 146b and a horizontal leg 146a are secured by welding to the lower outer surface 138 of wall 137. The safety barrier is secured to the top wall 92 by a plurality of fastening elements 152, each of which passes through an aperture in a horizontal leg 146a of a right angle member 146, and co-acts with a grommet 151 to hold the safety barrier in place. As shown in FIGS. 13 and 14, grommet 151 consists of upper disk 151a, cylindrical shell 151b and fingers 151c. When fastening element 152 is inserted into grommet 151, the bulbous portion 152c at the lower end of shank 152b engages groove 151d, which is formed on the inner surface of fingers 151c. This embodiment of a fastening element and grommet to hold the safety barrier in place may be configured to prevent separation of the fastening element from the grommet, and thus ensure that the safety barrier remains in place. For example, mating horizontal surfaces on the top of bulbous portion 152c and upper edge of groove 151d in grommet 151 will restrict upward movement of fastening means 152.

The safety barrier is preferably made of a metal such as aluminum or stainless steel which is corrosion-resistant. The grommets are preferably made from a heat resistant non-metallic material such as a synthetic resin. As shown in FIGS. 9, 10 and 13, the structure and arrangement of the grommets are such that the metal of the safety barrier is prevented from coming into contact with the metal of the top wall 92 of side cooker 80. Also, the safety barrier is mounted in spaced relation to the utensil support 96 and therefore does not contact this support as shown in FIGS. 4 and 12.

It is obvious that the safety barrier may be made in a variety of configurations and the diameter may be significantly greater than that of the burner opening in order to retain in place relatively large pots and pans.

The invention will now be more specifically described by the claims which follow.

What is claimed is:

1. Safety apparatus for a stove having a top wall defining an opening for a burner element, and support means for supporting a food cooking container over said burner element, said safety apparatus comprising safety barrier means positioned in spaced relation to said container support means for at least partially surrounding said food cooking container, and retainer means for mounting said safety barrier means in a fixed position on said top wall such that lateral movement of said food cooking container off of said support means is prevented by engagement with said safety barrier means, said safety barrier means comprising a barrier member extending about and in spaced relation to the side of said food cooking container and a plurality of mounting elements connected to said barrier member, said top wall being provided with a plurality of apertures circumferentially spaced about said burner opening for cooperating with said retainer means to secure said safety barrier means in place on said top wall, and said retainer means being made of a heat resistant, non-metallic material and engaging said mounting elements and the edges of said apertures so as to prevent contact between said safety barrier means and said top wall.

2. Safety apparatus according to claim 1 in which said safety barrier member comprises at least a pair of vertically spaced apart, substantially coaxial wire rings and a plurality of wire legs, each extending vertically between and connected to said wire rings.

3. Safety apparatus according to claim 2 in which said wire rings comprise an upper ring and a lower ring, and in which each of said mounting elements comprise a lower portion of a corresponding one of said plurality of vertically-extending wire legs extending below said lower ring.

4. Safety apparatus according to claim 1 in which said retainer means comprises heat resistant, non-metallic grommets fitted within said apertures and each having an axial passage for slidably receiving the lower portion of a corresponding one of said legs.

5. Safety apparatus according to claim 4 in which each of said grommets is non-removable and has at least two resilient fingers, each projecting radially outward from a sidewall thereof and arranged to permit sliding insertion of said grommet into a corresponding one of said apertures and after said insertion to engage an underside portion of said top wall for preventing removal of said grommet from said aperture.

6. Safety apparatus according to claim 1 in which said retainer means comprises grommets made of a heat retainer, non-metallic material and fitted within said apertures, and in which each of said grommets has an axial passage for slidably receiving at least a part of a corresponding one of said mounting elements.

7. Safety apparatus according to claim 1 in which said safety barrier member comprises a cylindrical band.

8. Safety apparatus according to claim 1 in which said safety barrier member comprises a metallic band having perforations in the wall thereof.

9. Safety apparatus according to claim 1 in which said top wall is provided with a plurality of first apertures, in which said safety barrier member comprises a perforated cylindrical band provided with a plurality of radially extending mounting elements at the lower edge thereof, each of said elements having a second aperture arranged for axial alignment with a corresponding one of said first apertures, and in which said retainer means includes means for holding said first and second apertures in co-axial alignment.

10. Safety apparatus according to claim 9 in which said means for holding said apertures in co-axial alignment comprises a plurality of grommets, one secured in each of said first apertures, and fastening means extending through said first and second apertures and securely engaging said grommets.

11. Safety apparatus according to claim 10 in which said fastening means comprises a shank portion, a knob portion at the upper end of said shank portion, and a bulbous portion at the lower end of said shank portion, and in which said grommet comprises means for cooperating with said bulbous end to lock said shank within a passage of said grommet.

12. Safety apparatus according to claim 1 wherein said burner comprises a gas-fired burner.

13. Safety apparatus according to claim 1 wherein said top wall and said safety barrier means are both made of metal.

14. Safety apparatus according to claim 1 wherein said stove comprises an auxiliary cooker apparatus mounted on one side of a gas-fired grill having fuel supply means, a housing defining a compartment for a main gas burner and means for providing fluid communication between said main gas burner and said fuel supply means, and wherein said stove burner element comprises a gas-fired burner and means for providing fluid communication between said gas-fired burner and said fuel supply means.

* * * * *

UNITED STATES PATENT AND TRADEMARK OFFICE
CERTIFICATE OF CORRECTION

PATENT NO. : 4,934,333

DATED : June 19, 1990

INVENTOR(S) : John S. Ducate, Jr.

It is certified that error appears in the above-identified patent and that said Letters Patent is hereby corrected as shown below:

Column 6, line 16, change "retainer" to --resistant--.

Signed and Sealed this

Twenty-first Day of May, 1991

*Attest:*

HARRY F. MANBECK, JR.

*Attesting Officer*    Commissioner of Patents and Trademarks